FIG.1

INVENTOR.
Benjamin J. Lazan
BY
Wm. R. Glisson
ATTORNEY

FIG. 2

INVENTOR.
Benjamin J. Lazan
BY Wm. R. Glisson
ATTORNEY

INVENTOR.
Benjamin J. Lazan

BY Wm. R. Glisson
ATTORNEY

June 2, 1964     B. J. LAZAN     3,135,106

STATIC-DYNAMIC FATIGUE-CREEP TESTING APPARATUS

Filed July 8, 1960     9 Sheets-Sheet 6

INVENTOR.
Benjamin J. Lazan

BY

Wm. R. Glisson
ATTORNEY

June 2, 1964  B. J. LAZAN  3,135,106
STATIC-DYNAMIC FATIGUE-CREEP TESTING APPARATUS
Filed July 8, 1960  9 Sheets—Sheet 9

INVENTOR.
Benjamin J. Lazar
BY Wm. R. Glisson
ATTORNEY

United States Patent Office 3,135,106
Patented June 2, 1964

3,135,106
STATIC-DYNAMIC FATIGUE-CREEP
TESTING APPARATUS
Benjamin J. Lazan, St. Paul, Minn., assignor to The
Budd Company, Philadelphia, Pa., a corporation of
Pennsylvania
Filed July 8, 1960, Ser. No. 41,634
19 Claims. (Cl. 73—15.6)

This invention relates to combination testing apparatus providing selectively for static or dynamic testing, or both, or creep or fatigue testing with either static or dynamic loads or both.

One of the particular objects of the invention is to provide apparatus which is adapted to have static or dynamic or creep testing units readily assembled or removed thereby furnishing a great variety of tests by simple and relatively inexpensive apparatus.

Another object is to provide a simple basic frame structure which is adapted to replaceably support a number of different testing units.

Another object is to provide an improved dynamic testing unit of a simple and inexpensive type which is formed as an independent unit designed to be used with or without a static testing unit.

Another object is to provide an improved eccentric vibratory device which can be quickly and accurately adjusted.

Another object is to provide an improved mount for vibratory equipment which will completely inhibit side movement in one direction and which will maintain a unidirectional line of force on the specimen without angular inclination within the vicinity of the vibratory unit.

Another object is to provide an improved self-contained static load applying unit which is adapted to be used with or without the dynamic testing unit.

Another object is to provide a static load applying unit having improved load applying means.

Another object is to provide a static load applying unit having means for cycling the load automatically within adjustable limits.

Another object is to provide a static load applying unit having a C-spring loading element with ball joints and with securing means providing rapid interchange between C-springs of different strengths.

The above and other objects and various features of novelty will be apparent from the following description of an exemplary embodiment reference being made to the accompanying drawings wherein.

Figure 1:
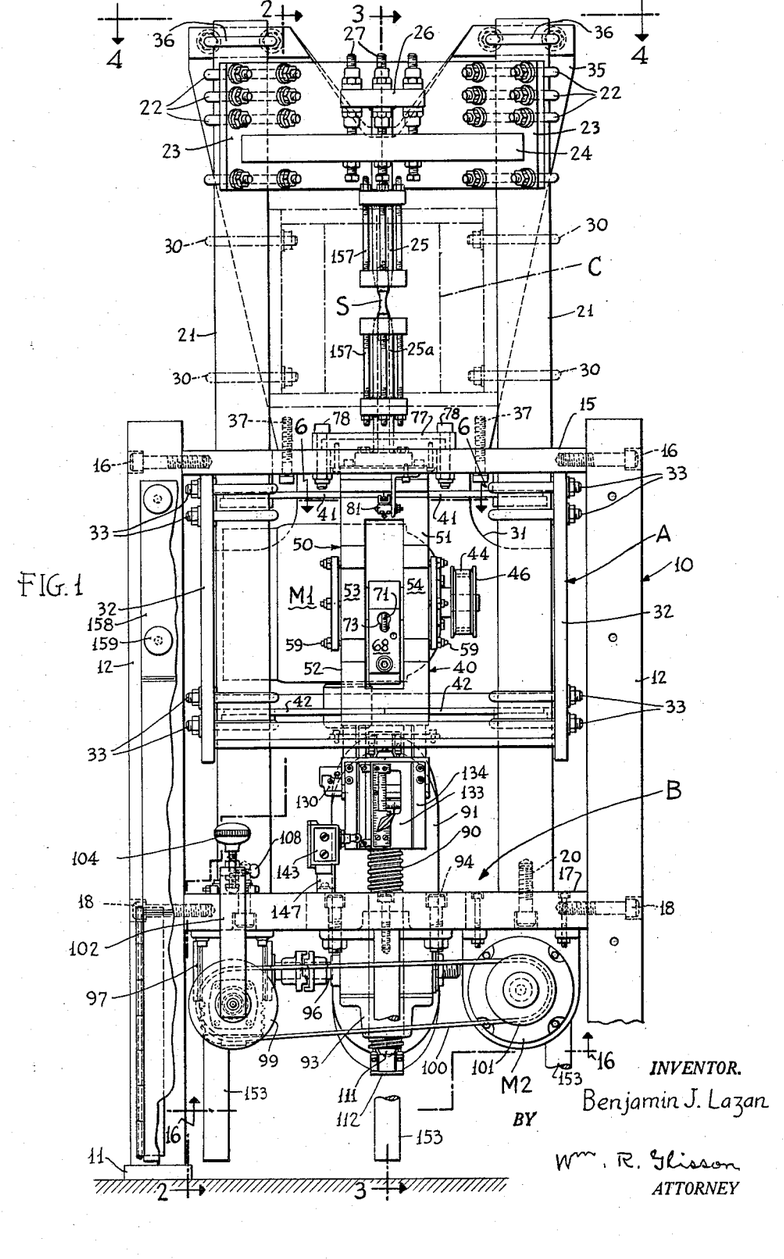
FIG. 1 is a front elevation, with some parts broken away, of a combination testing machine embodying the invention.
Figure 2:
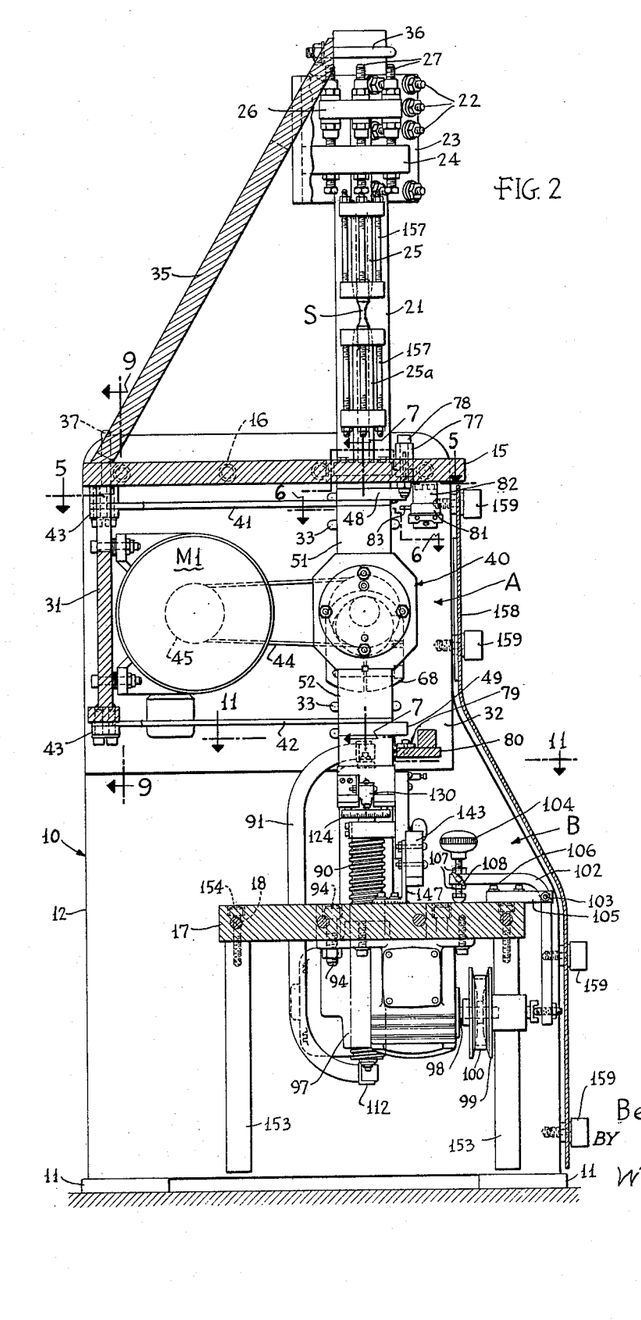
FIG. 2 is a vertical section taken on the line 2—2 of FIG. 1.
Figure 3:
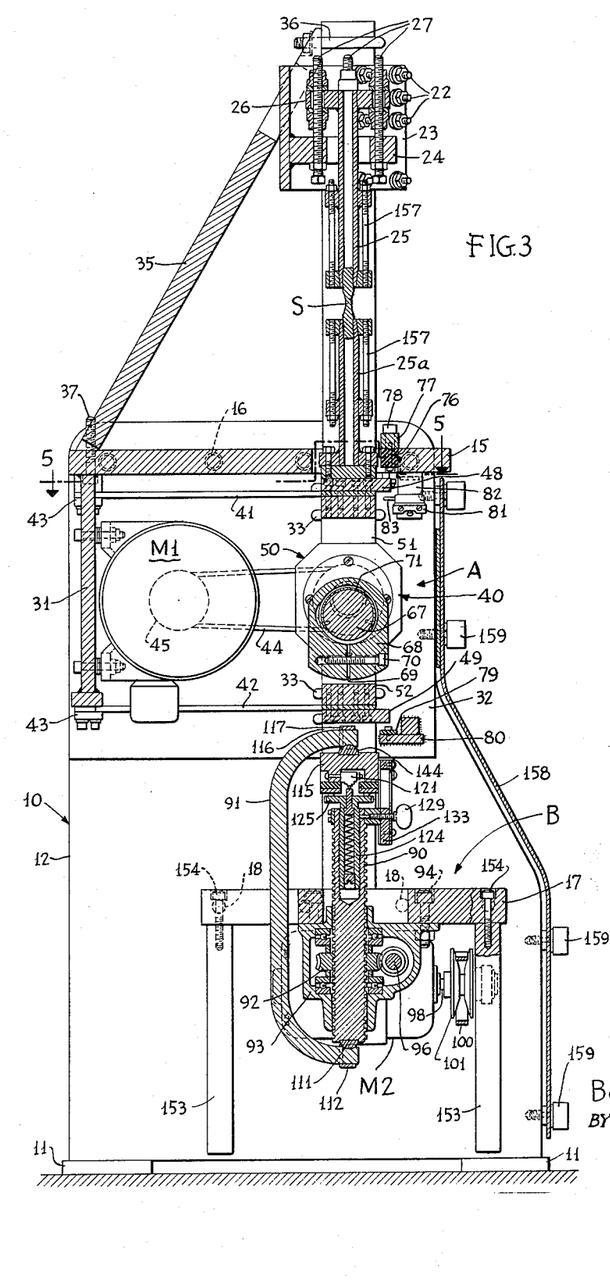
FIG. 3 is a vertical section taken on the line 3—3 of FIG. 1.
Figure 4:
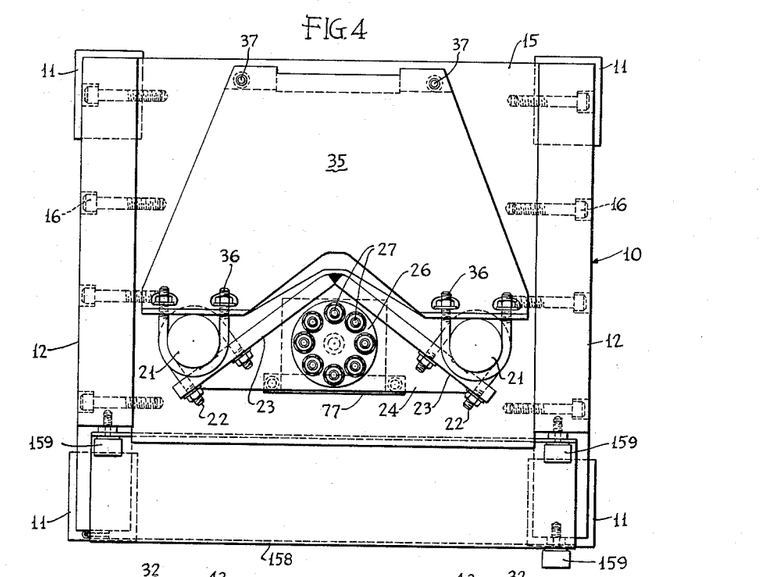
FIG. 4 is an enlarged top plan view taken on the line 4—4 of FIG. 1.
Figure 5:
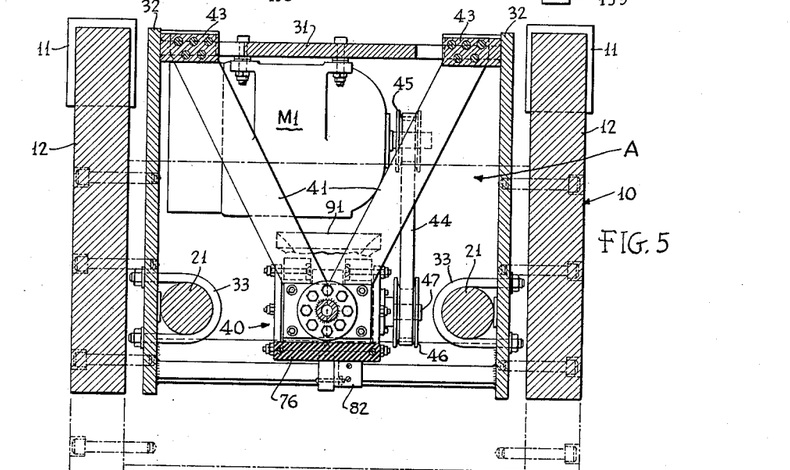
FIG. 5 is an enlarged horizontal section taken on the line 5—5 of FIGS. 2 and 3.
Figure 6:
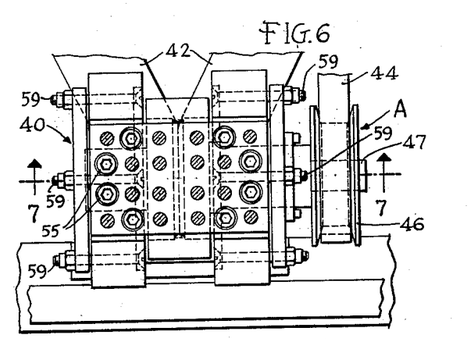
FIG. 6 is an enlarged partial horizontal section taken on the line 6—6 of FIGS. 1 and 2, the section also being shown in FIG. 7.
Figure 7:
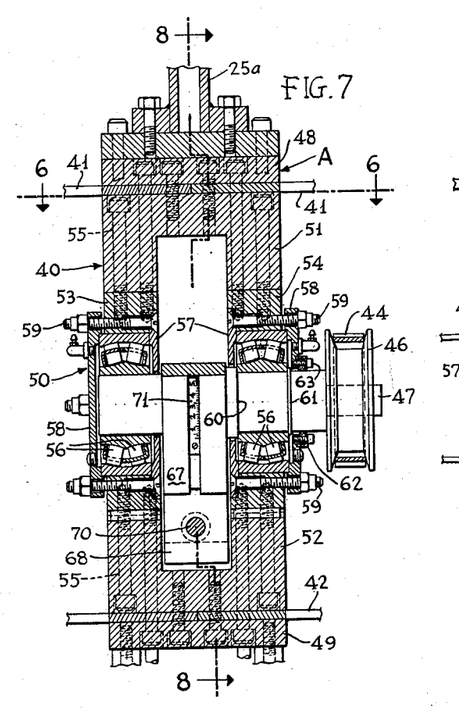
FIG. 7 is an enlarged partial vertical section taken on the line 7—7 of FIG. 2, the section also being shown in FIG. 6.
Figure 8:
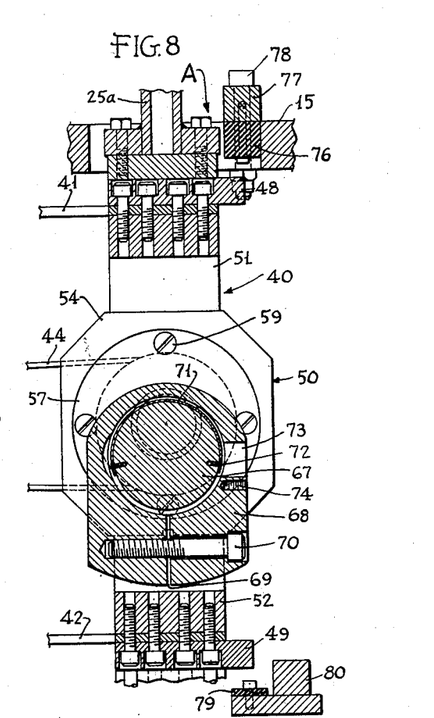
FIG. 8 is a vertical section taken on the line 8—8 of FIG. 7.
Figure 9:
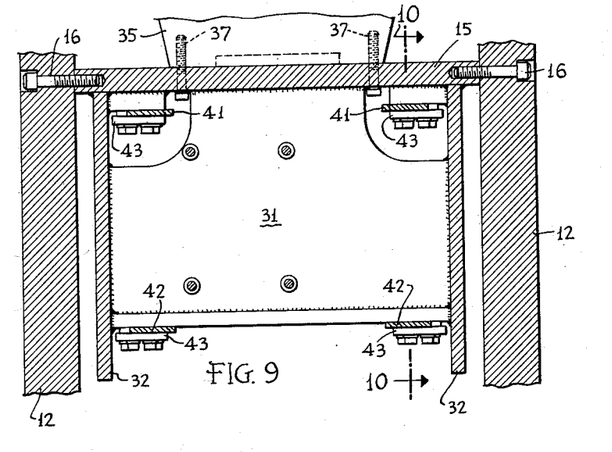
FIG. 9 is a vertical section taken on the line 9—9 of FIG. 2.
Figure 10:
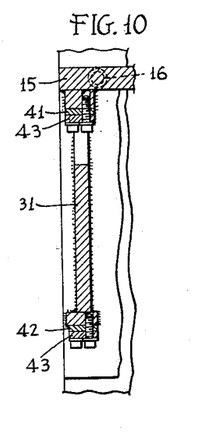
FIG. 10 is a vertical section taken on the line 10—10 of FIG. 9.
Figure 11:
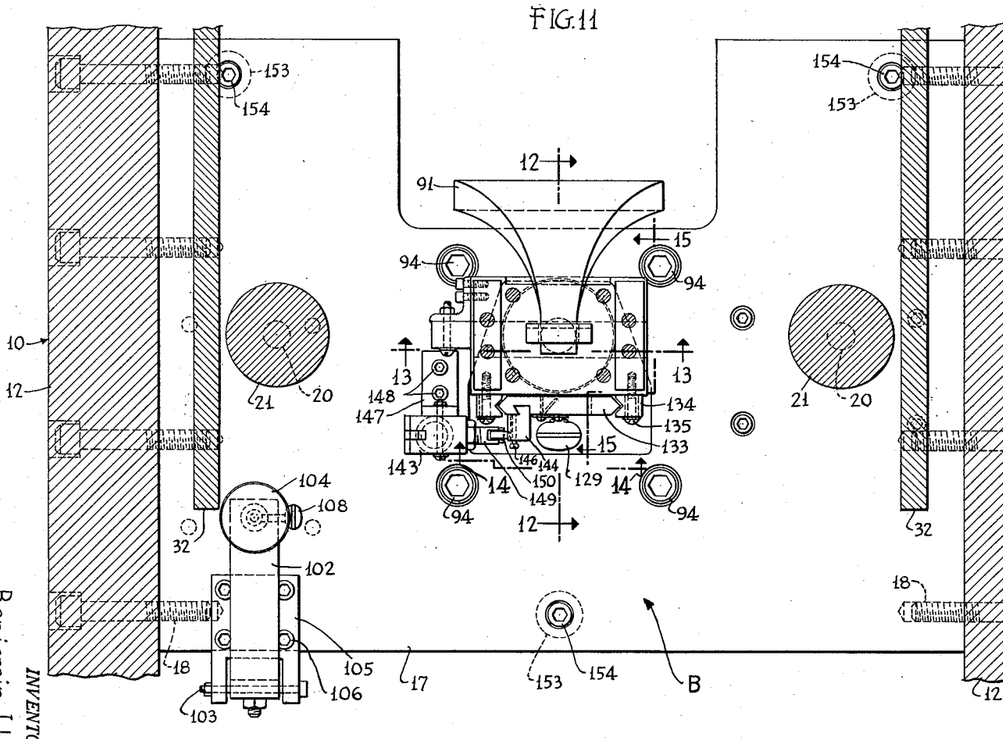
FIG. 11 is an enlarged horizontal section taken on the line 11—11 of FIG. 2.
Figure 12:
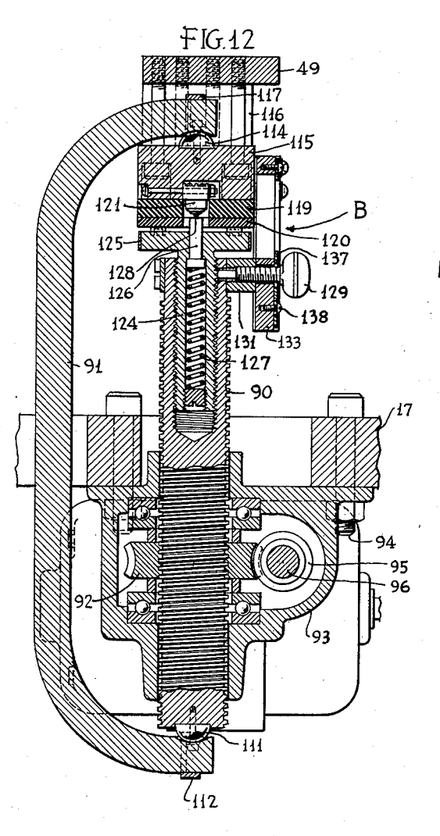
FIG. 12 is a partial vertical section taken on the line 12—12 of FIG. 11.
Figure 13:
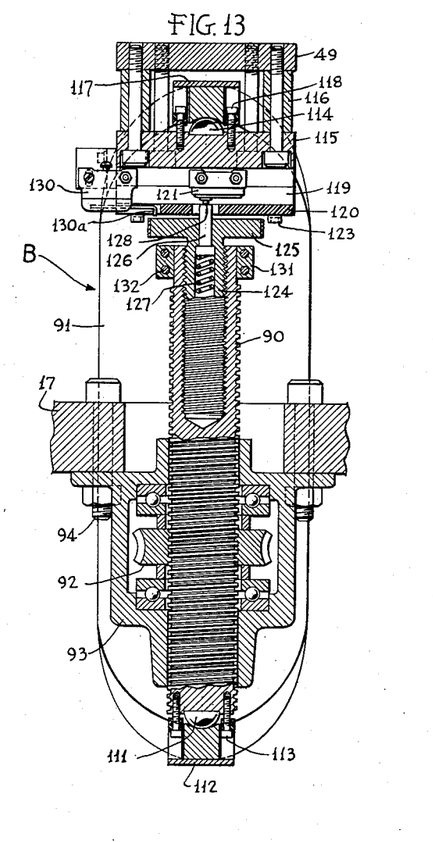
FIG. 13 is a partial vertical section taken on the line 13—13 of FIG. 11.
Figure 14:
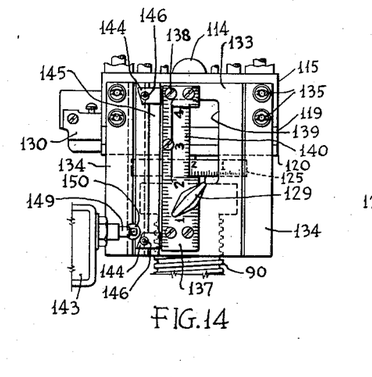
FIG. 14 is a partial front elevation taken on the line 14—14 of FIG. 11.
Figure 15:
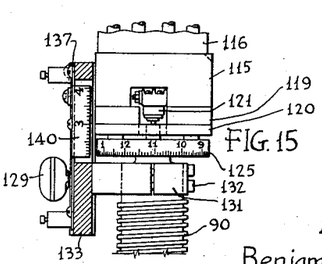
FIG. 15 is a partial side elevation and section taken on the line 15—15 of FIG. 11.
Figure 16:
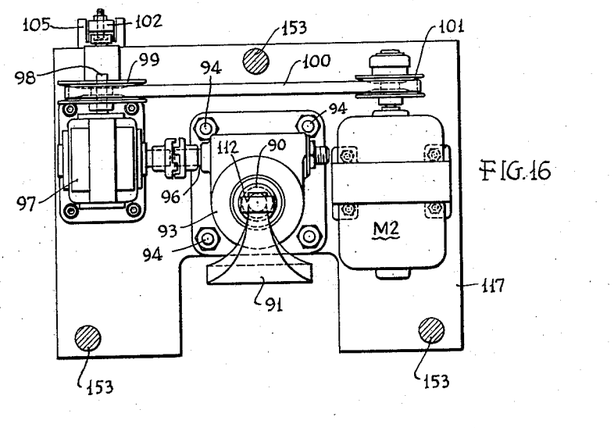
FIG. 16 is a horizontal section and bottom plan view taken on the line 16—16 of FIG. 1.

*General—FIGS. 1–3*

The apparatus illustrated includes a main frame 10 mounted on vibration isolating pads 11 on the floor. The frame is provided with side members 12 which rest at the bottom on the pads 11 and which at the back are provided with vertical edges which are adapted to rest on pads on the floor if these edges are placed downward. The frame is thus adapted to be mounted either vertically or horizontally. The vertical mounting is illustrated and will be described herein but the terms of orientation which are used for convenience only and do not exclude the horizontal arrangement.

At the top the side members 12 are connected by a top plate 15 secured thereto by cap screws 16; and near the bottom they are connected by a lower plate 17 secured thereto by cap screws 18.

To the lower plate 17 there are secured, as by cap screws 20, two large columns 21 which carry, internally of the side members 12, the major portion of all loads incurred in testing. Various units can be readily secured to or removed from these basic load-carrying columns to provide universal testing facilities at low cost.

The columns are anchored at the top by an inclined brace plate 35 secured to the columns by U-bolt clamps 36 and secured to the rear edge of the top plate 15 by cap screws 37.

Near the top of the columns 21 there is secured, as by U-bolt clamps 22, a head 23 having a support plate 24 carrying a specimen grip 25. The grip may be of any desired type depending on the type and size of specimen to be tested and to some extent on the type of test to be made. The grip illustrated is provided with a flange 26 adjustably secured to the plate 24 by bolts 27. The specimen is designated as S.

Intermediately these is provided a dynamic test unit A and below it there is provided a static test unit B. The dynamic unit could be used without the static unit or the static unit could be used without the dynamic unit, in the latter case an appropriate spacer being inserted or the head 23 being moved down on the columns if the dynamic unit is not present. A creep test oven C is shown in outline as being located around the specimen when desired, being secured to the columns by U-bolt clamps 30.

*Dynamic Unit—FIGS. 4–10*

The dynamic unit A is provided with a back plate 31 and integral side plates 32, the latter being secured to the columns by U-bolt clamps 33. Plate 15 is a part of the self-contained dynamic unit, being welded to the back plate 31 and side plates 32.

The dynamic unit A comprises a vibrator head 40 mounted between upper flex plates 41 and lower flex plates 42 which are secured at their rear ends by suitable clamp anchorages 43 to the top plate 15 and back plate 31, upper and lower respectively. A drive motor M1 is mounted, as by bolts and resilient washers, on the back plate 31 where it does not partake of the vibration and is connected by a drive belt 44 on motor pulley 45 with a pulley 46 secured on an eccentric shaft 47 of the vibrator head. The outer end of the belt swings about the motor shaft as an axis but the motor shaft is located midway vertically between the flex plate anchorages and the vibratory movement is quite small in amplitude so the belt stays tight at all times. The motor is of the type having a magnetic brake for immediate stoppage when de-energized.

The flex plates of each pair, upper and lower, are convergent at their forward ends and are secured together by adapter plates 48, 49 which provide attaching means above and below for adjacent units along the axis of loading of the test specimen S. The triangular arrangement of the flex plates inhibits all transverse shifting movement out of the load line or axis of the specimen. The upper adapter clamp plate 48 is adapted to be connected to a lower specimen grip 25b.

The vibrator head 40 includes a bearing frame 50 comprising an upper block 51, a lower block 52, a closed-end bearing block 53 and an open-end bearing block 54, all secured together by cap screws 55. In the blocks 53, 54 there are bearings 56 for the eccentric shaft 47. The bearings are retained by inner plates 57 and outer plates 58 held in place by bolts 59. The inner plates 57 are both apertured for the shaft. The outer plate 58 for the bearing block 53 is solid to cover the end of the shaft and the outer plate for bearing block 54 is apertured for the active end of the shaft to extend therethrough. The shaft 47 is retained in proper axial position by a shoulder 60 thereon and a snap ring 61 placed in a groove therein engaging on opposite sides of the inner race of the bearing in block 54. A dust guard ring 62 is secured to the apertured plate 58 by screws 63.

An eccentric 67 is provided on shaft 47 and on this eccentric there is adjustably secured an eccentric weight 68 which is split radially, as at 69 on one side and clamped on the eccentric by screws 70. An arcuate scale 71 is secured within a groove on the eccentric by screws 72, the scale being visible through an aperture 73 in the weight. The aperture is adapted to receive a window plug or a lighted scope (not shown) with hair line to aid in reading the scale and setting the position of the eccentric weight, one or more tapped sockets 74 being provided nearby for screws to secure the plug or scope in position.

When the weight 68, as shown, is on the same side of the shaft axis as the eccentric, the maximum unbalance is realized; and when it is on the opposite side, there is minimum unbalance, which could be zero if desired.

Means are provided for limiting the stroke of the vibratory head, especially after a specimen breaks. Here the upper plates 48 and 49 are extended forward to engage upper and lower bumper pads respectively. An upper bumper pad 76 is carried beneath a transverse support 77 secured to the top plate 15 by screws 78. A lower bumper pad 79 is carried by a transverse support 80 mounted between the side plates 32.

A stroke counting-micro-switch 81 is mounted on a bracket 82 beneath the plate 15 in position for its operating element 83 to be engaged by the front end of plate 48 of the vibrator head.

Static Unit—FIGS. 11–16

The static unit parts are mounted on the lower plate 17 and are adapted to exert a steady or alternating pull on the specimen by reaction against the lower plate. The reaction is transmitted through a power screw 90 and a single replaceable C-shaped load spring 91. The screw is moved up and down by a nut 92 confined in a casing 93 which is secured beneath the plate 17 by bolts 94. The periphery of the nut is formed as a helical worm gear driven by a worm pinion 95 on a power shaft 96. The shaft 96 is driven from a gear set in a gear casing 97, the gear set having a shaft 98 with a pulley 99 driven by a belt 100 actuated by a pulley 101 of a power motor M2. The gear case and motor are secured beneath the plate 17 by suitable bolts. The pulley 99 is divided and the outer portion is moved in or out axially to change the active radius engaged by the V-belt 100 by a lever 102 pivoted at 103 on the plate 17 and adjusted by a hand screw 104 acting against the top of the table. The pivot 103 is carried by a bracket 105 secured to the plate 17 by screws 106. The hand screw is held in adjusted position by lock nuts 107 or a thumb screw 108 or both. The other pulley 101 is divided circumferentially and the parts are urged together by a spring so that this pulley adjusts when the pulley 99 is adjusted.

The lower end of the power screw 90 is provided with a ball or spherical tip 111 which engages in a spherical socket in the lower portion of the C-spring 91 and the spring and screw are held together by a yoke 112 embracing the spring end and secured to the end of the power screw by cap screws 113. The power screw is splined in its casing or otherwise held against turning.

The upper end of the C-spring 91 is provided with a spherical recess holding a ball or spherical element 114 seated on a transverse element 115 of a coupling cage 116 which connects with the dynamic head, or, if that is not present, with the lower specimen grip 25b. The end of the spring is held in position by a yoke 117 secured to the transverse element 115 by cap screws 118. Besides retaining the spring the yokes 112 and 117 prevent it from turning out of position.

The lower end of the cage is provided with rubber bumpers 119 faced at the bottom with a nylon plate 120, both being secured by cap screws 122. This absorbs shock when a specimen breaks.

Within a bottom recess the cage carries a microswitch 121 arranged to operate the motor M2 which traverses the power screw 90.

Means are provided to electrically and visually detect deflection of the calibrated spring 91. This means is mounted between the upper end of the power screw 90 and the upper end of the C-spring 91.

The upper end of the power screw 90 has threaded therein a pilot screw 124 provided with a hand adjusting flange or wheel 125 marked with a vernier scale on its periphery. A switch actuating plunger 126 carried by the adjusting screw 124 and pressed upward by a spring 127 engages the actuator 128 of the switch 121, the spring arrangement preventing damage to the switch when a specimen breaks. The nylon facing 120 below the rubber bumper strikes the top of the hand wheel 125 when a specimen breaks but the plunger 126 retracts against its spring and the switch is not harmed. A thumb screw 129 with a non-marring tip holds the screw 124 in adjusted position. A switch 130 mounted on the cage 116 has an operator 130a engaged by the top of the hand wheel 125 when a specimen breaks to stop the motor M2.

A top fitting 131 is secured to the upper end of the power screw, as by clamp screws 132, and the fitting carries a slide 133 operating in a guide formed by depending elements 134 secured to the cage 116 by cap screws 135. A scale plate 137 is secured to the slide 133, as by screws 138, the scale plate having an inwardly bent portion in a window 139 in the slide. The bent portion carries a vertical scale 140 adapted to cooperate with the hand wheel 125 and the scale thereon to determine the distance the hand wheel has been moved up from the upper end of the power screw and thereby the amount the spring 91 has been lengthened.

Means are provided for reverse cycling the static unit drive to impose different loads in alternation on the specimen and to adjust the length of the power screw travel and spring stretch for setting these loads. The means shown herein comprises a reversing switch 143 for motor M2 which operates the power screw and switch actuating members 144 adjustably secured in a key slot 145 of slide 133 by clamp screws 146. The switch 143 is secured to plate 17 by a bracket 147 and cap screws 148. It has an operator 149 with a cam roller 150 located in position to be actuated by the cam surfaces of the actuating members 144. The actuating members 144 can be set at any desired positions along the length of the slot in the slide, which is carried by the upper end of the power screw, hence any length of stroke and any position of stroke within the permissible range may be selected.

The mounting of the C-spring 91 is such as to permit the rapid change of springs so that a wide range of spring loadings may be had. During reverse cycling the pilot screw can be turned fully down and the pilot switch 121 inactivated.

The entire static unit can be quickly removed from assembly and, for convenience in handling, for the protection of parts thereon or for separate test use with other equipment, is provided with legs 153 secured to plate 17 by cap screws 154.

*Operation*

The specimen is inserted in the specimen grips 25, 25a and the bolts 157 pulled up until the ends of the specimen are securely held. The specimen grips and the upper grip mounting and adjusting means are of a known type and need not be described in further detail.

If a straight static test is desired, the hand wheel 125 is turned to move screw 124 up from its bottom position to impose the desired load on the specimen. As the screw 124 carries the switch operating plunger 126 it operates switch 121 to cause motor M2 to lower the power screw 90 and thereby stretch the spring 91.

If the specimen yields at any applied load the cage 116 and switch 121 will be lowered. This causes the switch to be operated and the motor to run until the elongation for the given loading is taken up. Stated another way, the pre-set loading is re-established until elongation stops or until the specimen breaks.

If the specimen breaks the stop switch 130 is operated to de-energize the controls.

If the creep test heating unit C is used the static tension applying equipment is used in the same way as described above or in such other way as desired within the capabilities of the equipment.

If fatigue tests are desired the motor M1 of the dynamic unit is set into operation at any speed desired and at any desired setting of the eccentric weight. The static loading apparatus may be operated in any desired way during dynamic testing. If the specimen breaks the switch 81 will stop motor M1, its magnetic brake preventing over-travel which would disturb the stroke-counting record.

Instead of using the hand adjustment, the alternating high-low load cycle may be used by proper settings of the operators 144 of the reversing switch 143.

The creep test heating unit can be used during operation of the dynamic unit as well as with the static unit.

Since all three units can be operated together or any one alone, and since the C-springs 91 can be quickly changed for springs of different strength, it can be seen that a great range of different tests can be run with this apparatus.

When the apparatus is not in use it is protected by a front closure 158 secured by hand screws 159.

While the above description has deal with a combined testing assembly it is to be particularly noted that the different units are each made as a completely self-contained assembly. The units are connectible and disconnectible in two different aspects: first, along the line of force transmitted to the specimen; and second, along the exterior mounting on the common supporting means, here the columns 21 which are located as near the line of force as feasible.

Other supports 12 are shown herein, the plate 17 of the static unit and the plate 15 of the dynamic unit being secured to it, besides being secured to the heavy load transmitting columns 21. These side member supports 12 are shown as being quite thick and heavy to act as seismic shock-absorbing members which are especially useful to reduce vibration, noise and shock when the dynamic unit is being used. They might be dispensed with, especially when the static unit is used without the dynamic unit. The legs 153 of the static unit could then be used for support on the floor or other base, suitable attachment to the base or floor being provided. The columns 21 could be made shorter or longer as required by the specimens to be tested or other factors.

The dynamic unit could be detached from the static unit and used alone. It could be left attached to the same columns and adjusted along them as required; or the unit could be removed by sliding off the columns (other parts being removed to permit) or the columns pulled out of the dynamic assembly. Other columns of desired length and base mounting could then be provided to suit test requirements. Seismic shock plates of desired size would preferably also be provided when the dynamic unit was used.

The dynamic unit being completely self-contained, it can even be mounted on some suitable support and its vibratory head connected to test bodies of various shape, size and character. Preloads or adjustable loads can be established by making connection to the other side of the vibratory head.

It is also to be noted that the brace plate 35 is shown herein for stabilizing the upper ends of the columns for this particular assembly. If more adjustment of the dynamic unit is desired the member 35 can readily be removed or replaced by some other or anchored to the side members 12 instead of to the top plate 15 of the dynamic unit as shown.

Figures 17, 18:
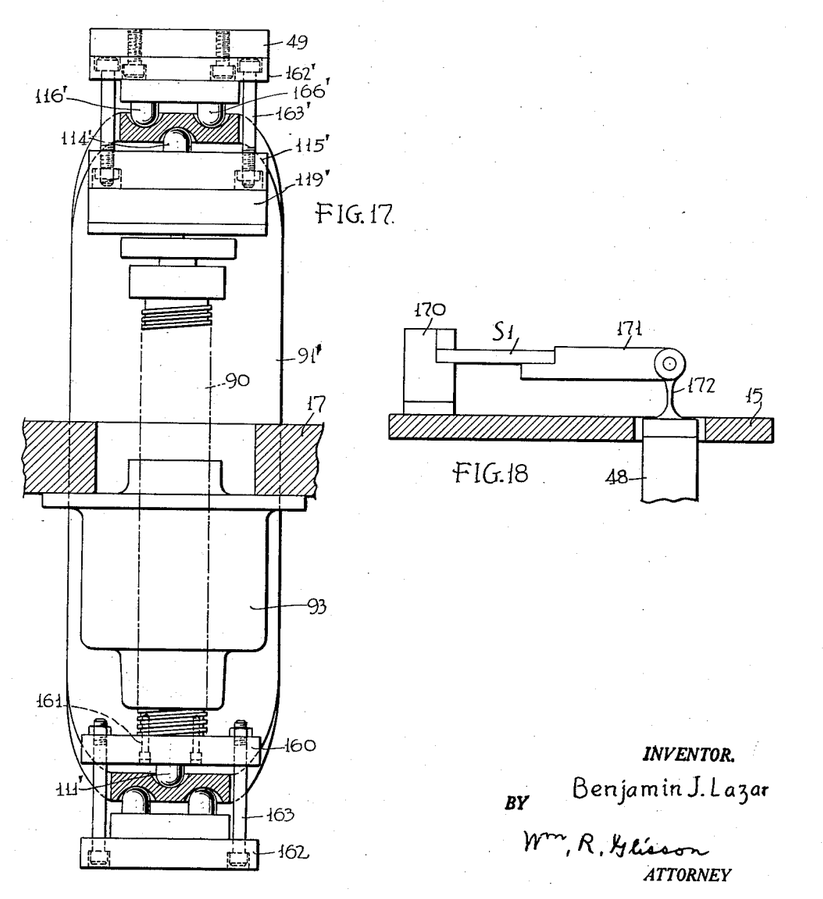
FIG. 17 is a view like FIG. 13 but showing an arrangement for applying both compression and tension loads.
FIG. 18 is a schematic view showing the apparatus used for applying bending loads.

FIG. 17 shows a modification—which may be considered the principal embodiment, the simpler one being shown in the assembly drawings for convenience in which the spring 91' is yoked with the screw 90 and the specimen connection by connections which transmit compression as well as tension.

At the bottom a bar 160 is secured to the end of screw 90 by cap screws 161 and a lower bar 162 is secured to the bar 160 by bolts 163. A ball member 111' carried by the bar 160 engages a socket in the end of the spring 91'. The end of the spring used here is wider than the end of the spring shown in FIG. 3. The bar 162 carries ball members 166 engaging sockets in the other side of the end of the spring 91'.

The ends of the spherical members 111' and 166 fit in oversized spherical sockets which bottom on a common horizontal line so that proper alignment is maintained in all bent positions of the spring.

The arrangement at the top is substantially the reverse duplicate of that just described. Here a bar 115' is secured to an outer bar 162' by bolts 163'. A ball member 114' engages the lower side of the end of the spring 91' and ball members 166' carried by 162' engage the other side of the end of the spring.

By this arrangement the spring is yoked for tension and compression action and the bolts 163, 163' may be tightened on the parts engaging the spring ends without in any way affecting the loading on the spring.

FIG. 18 shows how the test apparatus can be applied to testing a small beam S1 in bending, the beam having one end secured fast in a support 170 mounted on the plate 15 and the other end secured fast to an arm 171 which is attached by a flexible connection 172 to the load applying plate 48.

These forms are merely a few examples of the great variety of applications of the test units alone or in various combinations.

It is thus seen that the invention provides simple, efficient and interchangeable apparatus for performing a great variety of tensile tests.

While one embodiment of the invention has been described for purposes of illustration it is to be understood that there may be various embodiments and modifications within the scope of the invention.

What is claimed is:

1. Testing apparatus comprising in combination, a support frame, a specimen holder head mounted on said frame, and a static test unit mounted on said frame, said static test unit including a longitudinally movable load screw, motive means for moving said load screw axially, a C-spring connected at one end to one end of said load screw and having its other loading end connected to a specimen holder head beyond the other end of the load screw, a pilot hand screw carried by the end of said load screw adjacent the loading end of said C-spring, a power control switch for load screw movement carried by the loading end of said C-spring, a switch actuating plunger movable in a bore in said pilot hand screw, and a spring in said pilot hand screw urging said plunger outward and free to retract inward below the end of said hand screw.

2. Apparatus as set forth in claim 1 which further comprises, a power stop switch and an operator therefor carried by said cage and pilot screw for cutting off the load screw operating motive means when a specimen breaks.

3. Testing apparatus comprising in combination, a frame, an upper specimen holder secured to said frame, a vibrator unit secured to said frame, horizontal flex plates carried by said vibrator unit, a vibrator head supported on the outer end of said flex plates, a drive motor for said vibrator head mounted on said frame and having a swingable drive connection with said vibrator unit, a lower specimen holder secured to the top of said vibrator unit in position to hold a specimen carried by the upper specimen holder, a connecting cage secured to the bottom of said vibrator unit in the line of the specimen axis, a C-spring connected at its upper end by a ball and socket joint with said cage, a static test unit mounted on said frame, a load screw movable vertically in said static test unit, said C-spring at its lower end having a ball and socket connection with the lower end of said C-spring, a geared nut carried by said static test unit and threaded on said load screw for raising and lowering it relative to the static test unit to load said spring, power means for turning said nut, a pilot screw threaded in the upper end of said load screw below said cage, a power control switch carried by said cage above said pilot screw, and a spring-pressed plunger carried by said pilot screw for operating said power control switch.

4. Apparatus as set forth in claim 3 which further comprises an adjustable reversing switch and operating means therefor carried conjointly by said static test unit and the upper end of said load screw for continuously loading and unloading said spring by reversing the action of said power means for turning the nut.

5. Testing apparatus comprising in combination, a plurality of laterally spaced vertical columns, base support means for mounting said columns in fixed relation to each other, a specimen head-grip holding unit slidably mounted on said columns for holding a specimen in fixed relation to said columns, a dynamic test unit slidably mounted on said columns and provided with a movable specimen base-grip holder, a static loading unit connected to said columns and to said movable base-grip holder, and a creep test specimen temperature control unit surrounding a specimen clamped between said base-grip and said head-grip, each said unit being detachably mounted on said columns for removal or replacement.

6. A universal testing apparatus comprising in combination, a frame having an upper brace plate and a lower base plate,
a plurality of columns affixed at their ends between said brace plate and said base plate,
a support plate mounted on said columns,
an upper specimen holder carried by said support plate,
a static loading unit mounted on said base plate,
a calibrated spring having two ends, one of said ends being connected to said static loading unit,
a dynamic loading unit mounted on said columns having a head connected to the other end of said calibrated spring,
a lower specimen holder carried by said dynamic loading unit,
and a load screw in said static loading unit acting between said base plate and said calibrated spring to provide a predetermined physical displacement of said spring indicative of a static tension or compression load being applied to a specimen held between said specimen holders.

7. A universal testing apparatus as set forth in claim 6 which further includes flexible plates cantilevered from the dynamic loading unit and providing a beam support for said head of said dynamic loading unit.

8. A universal testing machine as set forth in claim 7 which further includes an eccentric cam mounted on a crankshaft in said head and a calibrated scale on said eccentric cam for determining the dynamic force applied by said eccentric cam.

9. Testing apparatus comprising in combination,
a base support;
a plurality of columns laterally spaced apart and axially fixed to said base support;
a static loading unit having a housing fixed to said base support and an axially movable rotatably fixed load screw mounted in said housing;
a C-shaped load spring mounted through an aperture in said base support, said C-shaped spring being fixed at one end to an end of said load screw for forming a flexible clamp encompassing said load screw of said static loading unit;
a lower specimen-holder head attached to the other end of said C-shaped load spring for axial movement therewith and constrained against lateral movement, an upper specimen-holder head attached to said columns above and in axial alignment with said lower holder head,
and power means including a worm and pinion internally threaded on said load screw for imparting axial movement to said load screw to apply either tension or compression to a specimen between said holder heads by imparting a force to said C-shaped load spring through movement of said load screw.

10. Testing apparatus as set forth in claim 9 which further includes an axially movable laterally fixed dynamic loading unit having a head mounted between said lower specimen-holder and the upper end of said C-shaped load spring and a dynamic drive unit mounted on said columns, said head being coupled to said drive by flexible drive means.

11. Testing apparatus comprising in combination,
a plurality of columns laterally spaced apart and axially fixed to a common base,
an upper crosshead unit axially fixed to said columns by bracket means,
a first specimen holder mounted on said upper crosshead,
a dynamic load unit having a power drive fixed to said columns by bracket means and an elongated vibratory dynamic head supported by said columns by flexible plates for lateral rigidity and axial movement,
a second specimen holder mounted on one end of said vibratory head opposite said first specimen holder,
a static load unit mounted to said common base having an axially movable drive screw,
and a spring affixed at one end to said drive screw for axial movement therewith and affixed at its other end to the other end of said vibratory head whereby static tension and compression forces applied by said static load unit are transmitted through said spring to a specimen held between said specimen holders.

12. A universal testing apparatus comprising in combination,
   a base frame;
   a horizontal support plate mounted on said base frame;
   a device for applying a static load to a test specimen mounted on said support plate;
   a device for applying a dynamic load to a test specimen mounted on said device for applying a static load to a test specimen;
   a specimen holder head mounted on said device for applying a dynamic load to a test specimen;
   said device for applying a static load to a test specimen comprising a housing fixed on said base frame, a load screw axially movable in said housing and a calibrated C-spring attached at one end to said load screw;
   said device for applying a dynamic load to a test specimen comprising an elongated housing mounted at one of its ends to said C-spring and at its other end to said specimen holder head, a crankshaft mounted in said housing and an eccentric cam mounted on said crankshaft;
   drive means for moving said load screw axially to apply a static load to said specimen by applying a force on one end of said C-spring;
   and electrical switch means on said device for applying a static load to a test specimen cooperable between the ends of said C-spring to actuate said drive means.

13. A universal testing apparatus as set forth in claim 12 which further includes calibration means on said device for applying a static load to a test specimen, said calibration means comprising a calibrated scale mounted on one end of said spring and a cooperating precision screw mounted in one end of said load screw operable as a micrometer to determine the deflection of said C-spring.

14. A universal testing apparatus comprising in combination,
   a base frame having side supports,
   a horizontal support plate connected to said side supports, said support plate having a plurality of apertures therein,
   a static load housing unit mounted on said support plate,
   a load screw mounted for axial movement in said fixed housing unit and passing through an aperture in said support plate,
   a static load C-spring attached to one end of said load screw for axial movement therewith and passing through another of said plurality of apertures,
   a dynamic load head mounted for lateral rigidity to said base support by flex plates and attached at one of its ends to the other end of said static load C-spring for axial movement therewith,
   a specimen holder head attached to the other end of said dynamic load head,
   and independent drive means for said load screw and said dynamic load head for applying either static tension or compression loads simultaneously with dynamic pulsating loads to said specimen holder head independent of each other.

15. A universal testing apparatus as set forth in claim 14 which further includes an eccentric cam on a crankshaft in said dynamic load head, and a calibrated scale for determining the circumferential displacement of said eccentric cam relative to the crankshaft indicative of the dynamic load to be applied by said dynamic load head.

16. A universal testing apparatus as set forth in claim 15 which further includes a micrometer screw and scale device mounted between the other end of said load screw and the other end of said C-spring for measuring the deflection of said C-spring indicative of the load applied to a test specimen.

17. Testing apparatus comprising in combination,
   a support frame having an upper and a lower mounting plate,
   an upper specimen holder head affixed to said upper mounting plate,
   a static loading unit including a base affixed to said lower mounting plate and having a load screw slidably fitted therein for axial movement relative to said mounting plates,
   load screw moving means for imparting said axial movement to said load screw,
   a calibrated C-spring fixed at one of its ends to one end of said load screw for axial movement therewith,
   a lower specimen holder head affixed to the other end of said calibrated load spring for axial movement therewith, said lower holder head being movable toward said upper holder head by movement of said load screw toward said upper holder head to apply compressive forces to a specimen held between said holder heads, said lower holder head being movable away from said upper head by movement of said load screw away from said upper holder head to apply tensile forces to a specimen held between said holder heads,
   and calibrated load spring deflection detection means mounted between the other end of said load spring and the other end of said load screw for determining the tensile or compressive forces applied to said specimen by said load screw acting through said calibrated load spring,
   calibrated load spring deflection detection means mounted between the other end of said load spring and the other end of said load screw for determining the tensile or compressive forces applied to said test specimen by said load screw acting through said calibrated load spring, said calibrated load spring deflection detection means having,
   a power control switch for actuating said load screw moving means, said switch being mounted on said other end of said load spring, and
   an axially adjustable actuating element mounted on said other end of said load screw cooperating with said control switch to maintain a tensile or compressive force in said load spring.

18. Apparatus as set forth in claim 17, which further includes a pilot hand screw threaded in said other end of the load screw for controlling the load screw moving means, and a scale carried by said screw for indicating the position of said pilot hand screw relative to the end of the load screw.

19. Apparatus as set forth in claim 18, wherein said controlling means operated by said pilot hand screw includes a switch carried by said load spring and a spring pressed plunger carried by said pilot hand screw for operating said switch.

References Cited in the file of this patent

UNITED STATES PATENTS

| 645,061 | Benson | Mar. 13, 1900 |
|---|---|---|
| 969,089 | Cillard | Aug. 30, 1910 |
| 1,557,341 | Scalbom | Oct. 13, 1925 |
| 1,865,070 | Amsler | June 28, 1932 |
| 2,215,958 | Fullerton | Sept. 24, 1940 |
| 2,303,621 | Donnelly et al. | Dec. 1, 1942 |
| 2,477,778 | Sonntag | Aug. 24, 1948 |
| 2,685,794 | Hall et al. | Aug. 10, 1954 |
| 2,693,699 | Federn | Nov. 9, 1954 |
| 2,702,473 | Dames et al. | Feb. 22, 1955 |
| 2,748,597 | Kooistra | June 5, 1956 |

FOREIGN PATENTS

| 17,309 | Great Britain | of 1906 |